United States Patent [19]

Shepherd

[11] E Re. 30,061

[45] Reissued Jul. 31, 1979

[54] NONWOVEN FIBROUS PRODUCT AND METHOD OF MAKING THE SAME

[75] Inventor: Robert C. Shepherd, Oak Lawn, Ill.

[73] Assignee: Johnson & Johnson, New Brunswick, N.J.

[21] Appl. No.: 694,328

[22] Filed: Jun. 9, 1976

Related U.S. Patent Documents

Reissue of:

[64] Patent No.: 3,759,775
Issued: Sep. 18, 1973
Appl. No.: 140,247
Filed: May 4, 1971

U.S. Applications:

[60] Division of Ser. No. 487,577, Jul. 11, 1974, abandoned, which is a continuation of Ser. No. 878,246, Nov. 19, 1969, abandoned, which is a continuation-in-part of Ser. No. 570,390, Jul. 26, 1966, abandoned.

[51] Int. Cl.[2] ..... B32B 5/02; B32B 5/18; D04H 1/68

[52] U.S. Cl. ..... 156/78; 427/373; 428/171; 428/221; 428/290; 428/310; 428/904

[58] Field of Search ..... 428/170, 171, 290, 296, 428/396, 401, 302, 904, 221, 310; 156/77, 78; 427/373, 372 R

[56] References Cited

U.S. PATENT DOCUMENTS

| | | | |
|---|---|---|---|
| 3,025,199 | 3/1962 | Harwood | 428/302 |
| 3,100,328 | 8/1963 | Allman, Jr. et al. | 156/183 |
| 3,395,201 | 7/1968 | Kalwaites | 428/170 |
| 3,403,969 | 10/1968 | Kautny et al. | 8/149.1 |

FOREIGN PATENT DOCUMENTS 1195233 6/1970 United Kingdom .

*Primary Examiner*—William J. Van Balen
*Attorney, Agent, or Firm*—Robert L. Minier

[57] ABSTRACT

This disclosure includes descriptions of nonwoven fibrous webs including a minor amount of a binder securing the interfiber connections to maintain the fiber superstructure and having web densities less than about 0.02 gm./cm.$^3$ which has heretofore been considered about the lowest density attainable. The disclosure also includes a unique method of manufacturing such webs and contemplates the preferred use of an air laid web of fibers thoroughly impregnated with a fluid which includes a small amount of a permanent binder, preferably less than about 10% by weight of the fabric and a very substantial amount of a volatile liquid in the order of 100% by weight of the fabric. The volatile liquid explosively puffs the fibers into a gossamer web not attainable by conventional techniques and the small amount of binder secures the fiber interconnections together to maintain the superstructure.

21 Claims, 4 Drawing Figures

NONWOVEN FIBROUS PRODUCT AND METHOD OF MAKING THE SAME

Matter enclosed in heavy brackets [ ] appears in the original patent but forms no part of this reissue specification; matter printed in italics indicates the additions made by reissue.

[This application is a continuation of application Ser. No. 878,246, filed Nov. 19, 1969, now abandoned, which is a continuation-in-part of U.S. application Ser. No. 570,390, filed on July 26, 1966, now abandoned.

*This application is a division of application Ser. No. 487,577, filed July 11, 1974, now abandoned, for reissue of U.S. Pat. No. 3,759,775. U.S. Pat. No. 3,759,775 issued on application Ser. No. 140,247 which was filed as a continuation of application Ser. No. 878,246, filed Nov. 19, 1969, now abandoned, which is a continuation-in-part of U.S. application Ser. No. 570,390, filed on July 26, 1966, now abandoned.*

This invention relates to nonwoven fibrous products and methods of making the same.

Despite the advanced state of the art of absorbent, through bonded, nonwoven fabrics, a satisfactory method of producing a very low fiber density, high bulk, absorbent through bonded fibrous sheet has not previously been developed and, consequently, a satisfactory very low density, high bulk, absorbent through bonded web has not been provided.

In general, the art has provided two basic techniques for laying fibers into webs or sheet. The first, and perhaps most widely known, is the wet laying of fibers on a screen or wire to form paper or paper-like sheets. The second technique is to lay the fibers in a dry condition by carding or air blowing against a foraminous support and adding a binder of some sort to hold the fibers in place. The latter dry formed webs are generally less dense and more absorbent than the paper-like sheets.

When a web is dry laid in the unstabilized state, such as, for example, by a web forming apparatus of the type wherein the fibers are carried in an air stream and deposited on a foraminous belt or cylinder, and thereafter bonded by impregnating the same with a binder throughout the web, the weight of the binder material as well as the application technique, tends to compact the web somewhat, thus increasing its fiber density and reducing its bulk. If the uniformity of binder impregnation is improved by passing the impregnated web over a suction slot, the web tends to become even more compacted. Even utilizing the best methods known for binder application compacting of the web cannot be avoided. The minimum fiber density and maximum bulk of such a bonded product is essentially limited by the fiber density and bulk of the web as originally formed by the dry laying apparatus, and it is difficult and impracticable to dry lay a fiber web of commercially available fibers having a density of less than about 0.02 gm./cm.$^3$.

It is even more difficult to provide a very low fiber density, high bulk, absorbent bonded nonwoven web utilizing a wet fiber laying process. Webs laid by such a wet process are usually paper-like in appearance and have a fiber density somewhat greater than a comparable stabilized dry laid web of the same fiber weight. The stabilization of a wet laid web is usually provided by the hydrogen to hydrogen bonds formed between the wet fibers. These bonds are usually strengthened by pressing the web as it comes off the forming wire to remove the excess water from the same. This pressing action additionally compacts the web, lowers its bulk, and increases its fiber density.

It is therefore an object of this invention to provide a method of making an absorbent, high bulk, very low fiber density stabilized web. It is a further object of this invention to provide a method of decreasing the fiber density of a web and increasing its bulk by increasing its thickness after it has been laid by either a wet or dry laying process, and then stabilizing the web in this state of increased bulk and thickness without adding a significant weight to the product.

It is another object of this invention to provide an improved fiber web composed primarily of fibers and having a density of less than about 0.02 gm./cm.$^3$.

It is still a further object of this invention to provide an improved fibrous web having enhanced absorbency resulting from a low fiber density less than about 0.02 gm./cm.$^3$ and fibers interconnected with a small amount of binder material to define communicating interstices.

It has been proposed to provide artificial leather-like materials by heavily impregnating a nonwoven web of fibers with a blowable plasticized polyvinyl chloride resin and then heating the same to decompose the blowing agent in the resin and to thus cause the resin to foam and create a fiber reinforced spongy material. By virtue of this process, the nonwoven fibrous mat is puffed somewhat to a thickness greater than its original thickness. However, because of the weight of the resin, the overall density of the web is actually increased substantially above that of the unblown fibers alone. In addition, the resin material fills most of the interstices between the individual fibers tending to create closed cavities, thus providing an essentially water repellent, or at least nonabsorbent, mat.

It has also been proposed in U.S. Pat. No. 3,100,328 to Allman et al., to subject webs containing extruded textile length fibers to violent steaming treatment as they are extruded and laid, the steam causing the fibers to swirl and to become entangled with other fibers as they are laid onto a support. The distortion of the fibers caused by the steaming of the web causes the web to bulk slightly and, thus, to become three dimensional. While some bulking may thus be obtained. It is only of minor magnitude, and even then the process is limited to textile length fibers which swirl and deform upon steaming. The resulting product is plastic-like, thin, and dense.

According to the present invention, a method is provided for the controlled "puffing" of a prelaid nonwoven web, the method being suitable for use in making a low fiber density, high bulk, absorbent stabilized nonwoven fabric.

Also, according to this invention, a novel and improved product is provided comprising predominantly short fibers such as cotton linters or wood pulp with a small amount of a binder securing the fibers together at their intersections to produce a web having a unique low density less than about 0.02 gm./cm$^3$.

The method comprises providing a nonwoven fibrous web, impregnating the web with a vaporizable liquid and a binder capable of securing the intersecting fibers together, vaporizing the liquid internally of at least portions of the web at a sufficiently faster rate than the rate at which the vapor can escape outward between the fibers and from the web to puff and expand at least portions of the web, and stabilizing these portions by setting the binder while the fibers are in a puffed condition. The degree of puffing may be closely controlled by controlling the rate of vaporization and vapor escape through the fibers and from the web and it is possible to puff a web to almost any degree and thus increase its thickness by 1% or less of its original thickness up to 10 times or more its original thickness and to stabilize the fibers in this exploded or puffed condition.

The product is essentially fibers having a small amount of binder for interconnecting the fibers in an expanded or exploded condition to provide high absorbency and low density. The puffed portion of the fibrous products prepared according to a preferred embodiment of this method essentially comprises longitudinally and transversely extending haphazardly arranged fibers. Carded webs or partially oriented webs of nonwoven fibers may also be used provided they are so disposed that the volatile liquid can operate effectively in the fiber structure. The fibers tend to define strata, which, in turn, define fiber chambers larger than the expected interstitial spaces, fibers chambers separating the fiber strata and acting effectively as pores within the plane of the fabric, the fiber strata having a fiber density at or near that of conventionally laid dry fibers and the fiber chambers having a considerably less dense fiber density.

The practice of the invention is not limited to any particular type, length or denier fibers and includes the use of waste fibers, such as chopped threads and the like. Thus, any of the natural fibers such as cotton, linen, hemp, silk, wool, or wood pulp; or synthetic fibers such as rayon, acetate, polyester, acrylic or modacrylic fibers may be used. The method may also be used with fibers of any length. However, it is of particluar usefulness with webs made up mostly, that is 70% or more, of relatively short fibers, namely, those having a length of less than about ½ inch and especially those having a length of less than about ¼ of an inch. Short fibers of this type such as cotton linters or wood pulp are particularly desirable for use in a low cost absorbent product due to their low cost and their ease of handling. In the past, the production of webs of these short fibers have presented the greatest problems with respect to providing low density, high bulk webs. Therefore, it is in producing webs of these short fibers that one may benefit most from the puffing and three dimensional effects which may be obtained through use of this invention.

A particularly suitable manner of carrying out the method of the present invention, and with respect to which the invention will be more specifically described, comprises providing a nonwoven fibrous web at least a portion of which contains both a small amount of binder and a substantial quantity of a vaporizable liquid. The binder is activated, that is, made adhesive, if necessary and the vaporizable liquid is heated rapidly internally of the web to explosively vaporize the same and to puff the previously impregnated portion of the web to an expanded though structurally weak, low density portion. The binder is then deactivated or set while the previously impregnated portion of the web is in its puffed or expanded state. This secures the fibers together where they intersect and provides substantial structural integrity. The term "vaporizable liquid" contemplates a liquid capable of generating gases at a very rapid rate at temperatures which can be tolerated by the common synthetic and natural fibers. It is preferred that the liquid have a relatively low surface tension so that it will tend to adhere to the fibers as it partially is vaporized, thus forming discrete, rapidly expanding bubbles of vapor or walls interconnecting the fibers to lift the fibers. It is further thought that the bubbles cannot immediately escape from the web where the interfiber membranes extend during the explosive action. Therefore, the gases expand more or less in situ until the bubbles or membranes release the vapor entrapped therein, which then readily escapes through and from the web. The more rapid the vaporization, the greater will be the number of these expanding bubbles thrust into a given interstitial volume within the web at a given moment. It is thought that if the total volume of these expanding bubbles in a given web portion at any moment is greater than the interstitial volume of that web portion, that web portion expands, or becomes puffed in an explosive manner.

To rapidly vaporize the liquid, dielectric heating means are preferably used because of the speed of the action and the internal nature of the heating. Dielectric heating occurs generally through the absorption of electrical energy in a dielectric material exposed to a rapidly changing electromagnetic field. Thus, when using dielectric heating means, generally only dielectric substances having a substantial loss factor within the web absorb electrical energy and are heated directly. The heat generated in the fibrous web and the fluids held in the web depends upon the frequency of the electromagnetic field applied to the product, the applied voltage, the effective capacitance of the plates and dielectric material and the power factor or loss factor of the web. The power dissipated in the fiber web can be calculated in watts from the equation:

$$W = \frac{2\pi f C E^2 (PF)}{10^6}$$

where f=frequency in Hertz

C=capacitance in microfarads

E=applied r.m.s. voltage

PF=power factor.

The dielectric liquid throughout the web will be rapidly heated fairly uniformly according to this equation rather than being heated much more slowly from the outside inwardly as is the case with conventional steam, hot air, or infrared dryers.

As will be described, certain additives will substantially improve the loss factor (lower the power factor) of the fiber web and thus enhance the rapid heating. These may also be conductive but no detrimental effect results therefrom provided there is an air gap between the heater plates.

A nonwoven fibrous web, a portion of which contains a small amount of binder and is impregnated with a vaporizable liquid may be provided in a number of ways. For example, the web may be an air laid nonstabilized web which is subsequently impregnated with vaporizable liquid such as water which contains a binder in solution or as an emulsion. The web may be an air laid web which has previously been through bonded with a soluble binder and which has been or may subsequently be impregnated with a solvent or activating agent for the binder which also acts as the puffing agent. The web may also be one which has been prestabilized only at discrete spaced portions. The type of binder and the amount of binder used depends upon the desired characteristics of the webs, including their drape, feel, absorbency, scuff resistance, and the like. The type and amount of puffing agent depends on the heat available and the other parameters.

The method of the invention is not limited to a web which is dry laid but is equally applicable to a web, either dry or still wet, formed by a wet process. If the wet formed web has been stabilized by pressing after forming, it is more difficult to puff the same, this difficulty probably being due to the hydrogen to hydrogen bonds formed between the web fibers.

If the vaporizable liquid is in fact a solvent for the binder, as the liquid is vaporized and the web dried of the liquid, the binder simultaneously becomes deactivated or set to interconnect the fibers and stabilize the web. The binder may also be present in the form of thermoplastic fibers or powder, such as plasticized cellulose acetate, and the like, dispersed throughout the web and having an activation temperature at or near the vaporization temperature of the vaporizable liquid. When using a thermoplastic binder and dielectric heating means, the binder activation and deactivation steps may again suitably be combined with the vaporization of the liquid. When the dielectric liquid is heated by virtue of the absorption of electric energy from the dielectric dryer and vaporized, the hot vapor within the web is sufficient to cause activation of the thermoplastic fibers or powder. As the web is dried and the conductive liquid is driven off, the loss factor goes down and there is less and less absorption of energy within the web and, therefore, less heating of the web. Thus, the thermoplastic fibers or powder becomes deactivated and bonds the nonthermoplastic fibers together at points of contact with the thermoplastic material.

Although as previously described, the liquid may act as an activating agent for the binder, the primary purpose of the liquid is to provide the vapor to puff the web. When using a volatile liquid and dielectric heating, the degree of puffing may be controlled by varying certain parameters, including the thickness of the web, the loss factor of the liquid, the surface tension or foamability of the liquid, the amount of liquid in the web, and the energy level of the dielectric dryer.

If the liquid used is tap water, in order that most of the vapor produced will be in the form of discrete expanding vapor bubbles or constrained by interfiber membranes, it is necessary to add a foaming or wetting agent to the water. These agents are generally those substances which significantly lower the surface tension of water, such as the polyoxyethylene sorbitan fatty acid esters and sorbitan fatty acid esters. Usually, only small amounts of these agents, on the order of from about 1/10 of 1% to about 1% by weight of the water need be used. However, in the case of a weak foaming agent or if substances which retard foaming are present, 10% or more of the foaming agent by weight of the water may be required. A particularly suitable agent is Triton GR-5, a sulfonated alkyl ester, sold by Rohm & Haas.

The higher the loss factor of the liquid solution, the more rapid is the heating and rate of vaporization. Likewise, the higher the energy level of the dielectric dryer and the higher the web liquid pick-up weight, the more rapid is the rate of vapor evolution. If the web is very thin, vaporization will occur essentially on the surface of the web, there will be little vapor entrapment by the liquid films and, thus, the vapor will rapidly escape from the web without effecting puffing. Thus, by varying any or all of these factors, the web is puffed to a greater or lesser extent as desired.

In order to heat and vaporize the volatile liquid with commercially available dielectric dryers, having an energy output of about 1 kw./inch width/100 feet (web velocity)/minute, rapidly enough to cause puffing of an impregnated web having a fiber weight of between about 3 and about 19 ounces/yard$^2$ and a thickness of between about 0.05 and about 0.30 inch, the web suitably has a liquid pick-up weight of from about 100% to about 600% and the liquid must have a substantial loss factor. In the case of water, this level of loss factor or power factor may be provided by adding small amounts on the order of from about 1/100 of 1% to 5% by weight of the weight of the water, of an electrolytic salt, such as ammonium chloride. For example, if tap water is the volatile liquid, the addition of a particular acrylic binder (sold as Hycar 2,600×120) in an amount of about 3% solids by weight to the water provides the necessary interfiber stabilization and increases the loss factor substantially. The addition of about 1/10 of 1% by weight of ammonium chloride further increases the loss factor and provides explosive vaporization in a dielectric heater as described. The resistance of an ammonium chloride water solution becomes asymptotic with a salt concentration of about 5% solids by weight and, therefore, there is little advantage in using salt concentrations above this level.

The invention will be better understood by reference to the attached drawings and the following description thereof.

Figure 1:
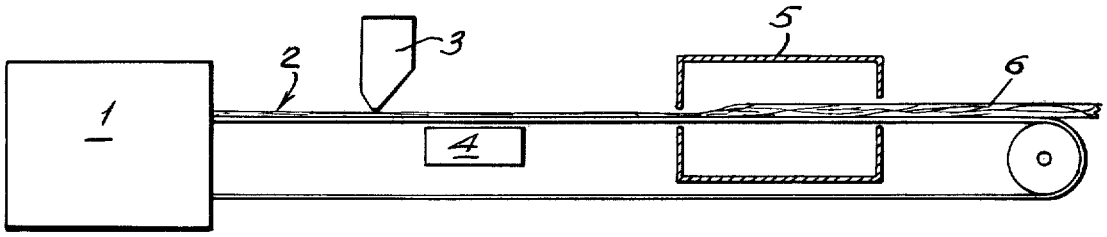
FIG. 1 is a diagrammatic representation illustrating schematically the production of a web of the present invention.

Referring specifically to FIG. 1, a web 2 is provided by air laying the web 2 on an apparatus 1 in which a stream of airborne fiber is passed through a foraminous belt to deposit the fibers on the belt, the apparatus being sold commercially as the Rando-Webber. The web is thereafter impregnated throughout with an acrylate binder in an aqueous emulsion contained in hopper 3 by applying the same to the top surface of the web and then passing the web over a suction box 4 by virtue of which the binder and water are distributed relatively uniformly throughout the web.

EXAMPLE I

One dry laid web 2, made according to this invention, has a fiber weight of about 3 ounces/yard$^2$ and once impregnated, has a thickness of about 0.05 inch. The web comprises 70 by weight of very short, i.e., 1/16 of an inch to ¼ of an inch, second cut cotton linters and 30% by weight of 1½ inch long rayon filaments. The binder comprises a water soluble acrylate binder in an aqueous carrier at a solids content of 3.0% by weight. The vaporizable liquid is the water vehicle for the binder. The aqueous carrier also contains about 0.1% by weight of ammonium chloride as soluble high loss material, and 0.4% solids by weight of a sulfonated alkyl ester wetting agent referred to earlier.

Since the binder is soluble in water, no separate step of binder activation is necessary in this Example I. The impregnated web is next passed through a dielectric dryer 5, the dielectric dryer 5 having an electrode gap of about 1¼ inch, a voltage input of about 13,000 volts, and a frequency of between about 15 and about 27 megahertz. By virtue of its high loss factor, the water solution rapidly absorbs energy from the dielectric dryer, thus causing the water in the interior of the web to rapidly heat, vaporize, and expand explosively causing the web to puff as shown at 6 in the figure. As the web 2 is thus dried, the water activated binder sets and the web at 6 is stabilized in its puffed condition. The stabilized puffed web has a thickness of about 0.5 inch and a fiber density of about 0.008 gm./cm.$^3$.

The surfaces of the expanded web are more dense than the interior for the reasons already mentioned.

EXAMPLE II

In another embodiment of the invention, a web of 75% second cut cotton linters and 25% approximately 1.5 inches long 1.5 denier rayon staple is dry laid with a Curlator Rando-Webber with a dry weight of 3.3 oz./yd.$^2$. The web is impregnated with a water solution containing 3% solids of Hycar 2600×120 of B. F. Goodrich Company and 0.4% solids of Rohm and Haas GR-5. The aqueous carrier contains 0.1% ammonium chloride which enhances the energy losses in the web. The total solution added on weighs 6.6 oz./yd.$^2$. The initial thickness of the dry web is about 0.2 inch and the wet web is reduced to about 0.13 inch. After puffing and drying, the web is about 0.5 inch thick and has a density of 0.009 gm./cm.$^3$.

EXAMPLE III

The web of Example II has also been made with only 5.2 ounces of solution per square yard. A similar result was obtained but the dry puffed web is only 0.4 inch thick and has a density of 0.011 gm./cm.$^3$.

Figure 2:
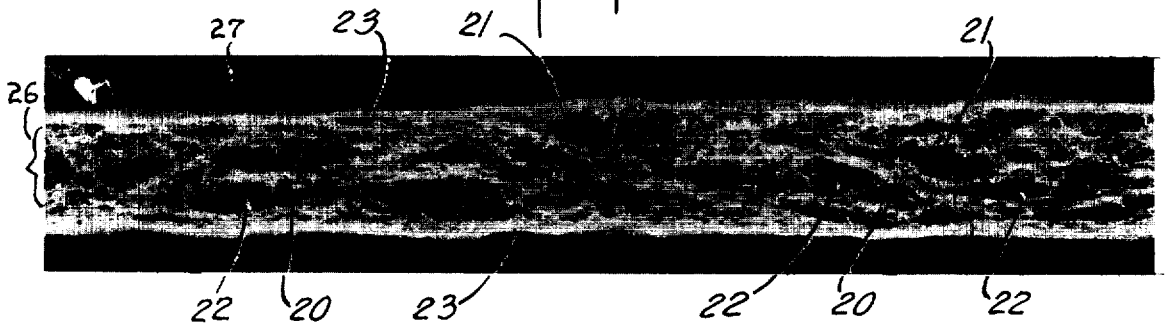
FIG. 2 is a cross section of a stabilized fibrous web prepared according to the method of this invention.
Figure 3:
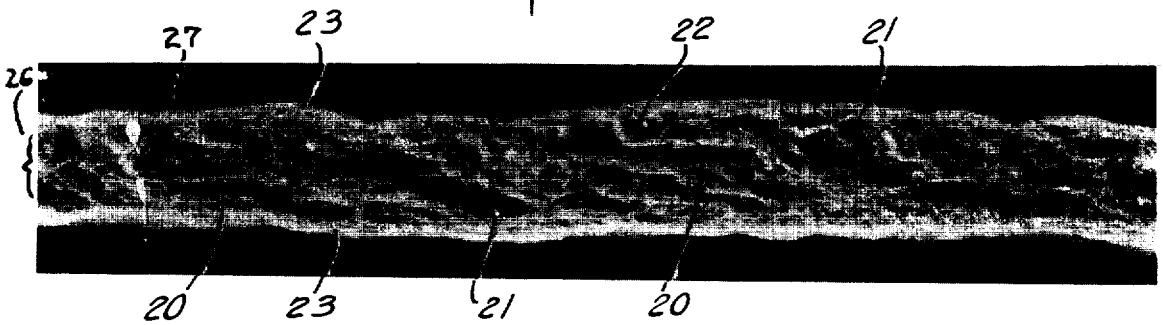
FIG. 3 is an end section of the same puffed web illustrated in FIG. 2.

Referring now specifically to FIGS. 2 and 3, there are shown magnified cross sections of the puffed web 6. The total thickness of these webs is actually about one-half inch or less. The puffed web has a cellular or honeycombed appearance throughout most of the stabilized portion and essentially comprises longitudinally and transversely extending haphazardly arranged fiber strata 20 and fiber chambers 21. The fiber chambers 21 separate fiber strata 20 and act essentially as pores within the body of the fabric. Most of the fiber strata 20 have a fiber density approaching that of the unexpanded web, and the fiber chambers 21 have a considerably lower fiber density than the surrounding fiber strata 20. Some portions 22 of the fiber chambers 21 are essentially devoid of fibers, and the chambers are defined by a large number of small fibers secured together at their junctions by a small amount of binder. The portion 23 of the web 6, near the surfaces of the same, is usually of more nearly uniform and higher density. This is thought to be due to the fact that the bubbles formed in the surface adjacent web portions escape relatively rapidly from the web and do not carry many fibers with them. Thus, no puffing occurs in this area.

During heating and drying of webs, most binders which are solvent activated, tend to migrate somewhat toward the surface of the web especially if the binder pick-up weight is relatively high; and, therefore, the surface adjacent portions 23 of the web may have a higher binder content than the center portions 26 of the web. As a result, a relatively hard "skin" 27 may be formed on the web surfaces. The web portions 26 interposed between the surface adjacent portions 23 tend to be less dense and remain softer and somewhat springy. Thus, a low density high bulk absorbent web may be provided which has a hard enough surface to be somewhat scuff resistant, thus minimizing the fluffing off of the surface fibers.

Figure 4:
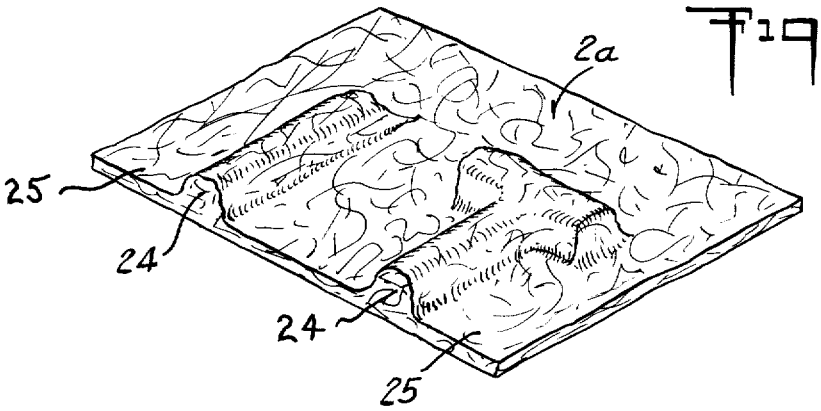
FIG. 4 illustrates a web having portions thereof which have been selectively puffed and portions thereof which have not been puffed.

In FIG. 4, there is illustrated a web 2a prepared according to the method of this invention in which certain areas 24 have been selectively puffed thereby providing decorative effects on the surface of the same. This puffing is produced by dry laying a web as previously described and then selectively impregnating portions of the same with the binder and volatile liquid followed by dielectric heating of the web and the balance of the web is stabilized by other techniques such as the use of a thermoplastic binder or interspersal of thermoplastic fibers. The portions 24 of the web 2a impregnated with the conductive foamable binder become puffed while the remaining portions 25 of the web remain substantially unchanged. Such selective puffing can also be obtained by uniform application of the binder and volatile liquid and the controlled and selective application of the required high levels of heat.

The fiber assemblies used in the manufacture of the improved puffed nonwoven fabrics described herein may advantageously use the fiber combinations described in detail in copending patent application Ser. No. 729,784 filed on May 16, 1968, now U.S. Pat. No. 3,663,348 and assigned to the assignee of this application, the various examples and teachings thereof being incorporated herein by reference. A combination of about 75% or more short fibers under about ¼ inch and about 25% or less long fibers of about ¾ inch or more have proven especially advantageous and economical.

The amount of binder should be selected to provide the desired interfiber bonds while maintaining the absorbent interstices. In the preferred embodiments, the binder comprises between about 4% and 10% of the fabric, by weight on a dry solids basis and with this amount, there is an optimum structural stability and minimum tendency to collapse while still maintaining lightweight and high absorbency. Binder add-on in the range of about 1% to about 30% of dry solids by weight can be used. The lower range is acceptable where increased structural collapse under compression is not excessively detrimental, and the upper range is useful where increased rigidity is desired although some increase in cost and weight and some decrease in absorptive capacity may be detected.

Products made from fiber webs made in accordance with this invention may include diapers, pads, sanitary napkins, and the like where high absorbency is a prime criteria. They may also prove advantageous where lightweight filler materials are desired although absorbency is not a prime requisite.

While specific embodiments of the invention have been described, the same should not be construed to be limited thereto and it should be apparent from the specification that a number of variations on the method and products of this invention may be made without varying from the spirit and scope of the invention.

What is claimed is:

1. The method of making a stabilized low density nonwoven fabric comprising the steps of:

providing a nonwoven web of discrete fibers;

impregnating said web with an aqueous liquid, the liquid being distributed throughout the web with a minor amount of added material also being distributed throughout the web, said added material acting as a binder capable of stabilizing said fibers as an interconnected web, said added material so acting as an agent altering the surface tension of the aqueous liquid to effectively form upon heating aqueous membranes within the web of spaced and interconnected fibers;

rapidly vaporizing the volatile portions of said aqueous liquid by applying heat substantially to an internal portion of said impregnated web at a rate sufficient to cause the expanding volatile portions of said aqueous liquid to form said aqueous membranes and to exert expansive forces on said aqueous membranes between said fibers and to thereby separate portions of said web and produce a puffed web portion; and setting the material which acts as a binder while said fibers are in the puffed condition to secure said fibers to one another at interconnections therebetween and thereby to define stable enlarged interstices between the fibers.

2. The method of making a stabilized low density nonwoven fabric comprising the steps of:

providing nonwoven web of discrete fibers;

impregnating said web with a liquid, the liquid being distributed throughout the web and containing a major proportion of volatile liquid material and a minor amount of added material, said added material acting as a binder capable of stabilizing said fibers as an interconnected web, said added material also acting as an agent altering the surface tension of the liquid to effectively form upon heating liquid membranes within the web of spaced and interconnected fibers;

rapidly vaporizing the volatile liquid material of said liquid by applying heat substantially to an internal portion of said impregnated web at a rate sufficient to cause the expanding volatile liquid material to form said [aqueous] *liquid* membranes and to exert expansive forces on said liquid membranes between said fibers and to thereby separate portions of said web and produce a puffed web portion; and setting the material which acts as a binder while said fibers are in the puffed condition to secure said fibers to one another at interconnections therebetween and thereby to define stable enlarged interstices between the separate portions.

3. The method of making a stabilized low density nonwoven fabric comprising the steps of:

assembling a nonwoven web of discrete fibers in a dry state wherein said web comprises predominantly short fibers having lengths less than ¼ inch and a minor percentage of long fibers having lengths in excess of about ¾ inch, impregnating said web with an aqueous liquid, the liquid being distributed throughout the web and containing a minor amount of added material, said added material acting as a binder capable of stabilizing said fibers as an interconnected web, said added material also acting as an agent altering the surface tension of the aqueous liquid to effectively form upon heating aqueous membranes within the web of spaced and interconnected fibers;

rapidly vaporizing the volatile portions of said aqueous liquid by applying heat substantially to an internal portion of said impregnated web at a rate sufficient to cause the expanding volatile portions of said aqueous liquid to form said aqueous membranes and to exert expansive forces on said aqueous membranes between said fibers and to thereby separate portions of said web and produce a puffed web portion; and setting the material which acts as a binder while said fibers are in the puffed condition to secure said fibers to one another at interconnections therebetween and thereby to define stable enlarged interstices between the fibers.

4. The method of making a stabilized low density nonwoven fabric comprising the steps of:

assembling a nonwoven web of discrete fibers wherein said fibers are predominantly short fibers having lengths less than ¼ inch;

impregnating said fibers with an aqueous liquid, the liquid being distributed throughout the fibers and containing a minor amount of added material, said added material acting as a binder capable of stabilizing said fibers as an interconnected web, said added material also acting as an agent altering the surface tension of the aqueous liquid to effectively form upon heating aqueous membranes within the web of spaced and interconnected fibers;

assembling said fibers as a wet layer to form a paper-like web;

rapidly vaporizing the volatile portions of said aqueous liquid by applying heat substantially to an internal portion of said impregnated web at a rate sufficient to cause the expanding volatile portions of said aqueous liquid to form said aqueous membranes and to exert expansive forces on said aqueous membranes between said fibers and to thereby separate portions of said web and produce a puffed web portion; and setting the material which acts as a binder while said fibers are in the puffed condition to secure said fibers to one another at interconnections therebetween and thereby to define stable enlarged interstices between the fibers.

5. The method of claim 1 wherein said added material comprises thermoplastic fibers which act as a binder and are dispersed throughout said web and engage said discrete fibers, the setting of said binder comprising plasticizing said thermoplastic fibers whereby said discrete fibers are interconnected and maintained as a puffed web.

6. The method of claim 1 wherein said added material is soluble in water.

7. The method of claim 1 wherein said added material is dispersed in water.

8. The method of claim 1 wherein said fibers are assembled in a dry state to form said nonwoven web.

9. The method of claim 1 wherein said fibers are assembled as a wet layer to form a paper-like wet web before vaporizing said aqueous liquid.

10. The method of claim 1 wherein said aqueous liquid is flowed freely onto said web and the excess liquid is removed therefrom by suction.

11. The method of claim 1 wherein said added material comprises a binder capable of securing said fibers together at their interconnections, and a surface tension agent which will dissolve in water and enhance the formation of said membranes.

12. The method of claim 1 wherein said web comprises predominantly short fibers having lengths less than about ¼ inch and a minor percentage of long fibers having lengths in excess of about ¾ inch.

13. The method of claim 1 wherein said liquid is vaporized and said web is expanded by the use of dielectric heating to concentrate the heat in the internal portions of said web.

14. The method of claim 1 wherein the amount of said binder is between about 4% and about 10% of the weight of said fabric on a dry solids basis.

15. The method of claim 14 wherein said binder is a water dispersible acrylate.

16. The method of claim 11 wherein said agent is a sulfonated alkyl ester.

17. The method of claim 1 wherein said added material further comprises an ionizing material soluble in water whereby the dielectric losses in said aqueous liquid are controlled by the amount of said ionizing material to thereby control the heating rate of said liquid and the puffing of said fabric.

18. The method of claim 17 wherein said ionizing material is ammonium chloride in an amount no less than about 0.01% by weight of said aqueous liquid.

19. The method of claim 1 wherein said binder migrates within said web during said vaporizing steps, said binder concentrating adjacent the surfaces of said web to provide enhanced interconnection of said fibers adjacent said surfaces.

20. The method of claim 1 wherein said binder is thermoplastically activatable at a temperature no greater than the vaporization temperature of said liquid and in which said liquid is vaporized by dielectric heating.

21. The method of claim 15 wherein said web comprises primarily short cellulosic fibers and wherein said web has a weight of from about 3 to about 19 ounces per square yard, said web is impregnated with said acrylic binder and liquid at a pick-up weight of at least about 100% and the dry weight of said binder comprises about 3% of the weight of the web.

* * * * *